(12) United States Patent
Sarawate et al.

(10) Patent No.: US 11,181,002 B2
(45) Date of Patent: Nov. 23, 2021

(54) TURBINE SYSTEMS WITH SEALING COMPONENTS

(71) Applicant: General Electric Company, Schenectady, NY (US)

(72) Inventors: Neelesh Nandkumar Sarawate, Niskayuna, NY (US); Venkat Subramaniam Venkataramani, Clifton Park, NY (US); Anthony Christopher Marin, Saratoga Springs, NY (US); Stephen Francis Bancheri, Albany, NY (US); Larry Steven Rosenzweig, Clifton Park, NY (US); Edip Sevincer, Watervliet, NY (US)

(73) Assignee: General Electric Company, Schenectady, NY (US)

( * ) Notice: Subject to any disclaimer, the term of this patent is extended or adjusted under 35 U.S.C. 154(b) by 1044 days.

(21) Appl. No.: 15/280,067

(22) Filed: Sep. 29, 2016

(65) Prior Publication Data
US 2018/0087394 A1 Mar. 29, 2018

(51) Int. Cl.
*F01D 11/00* (2006.01)
*F16J 15/08* (2006.01)

(52) U.S. Cl.
CPC ......... *F01D 11/005* (2013.01); *F16J 15/0806* (2013.01); *F16J 15/0887* (2013.01); *F05D 2240/11* (2013.01); *F05D 2300/175* (2013.01); *F05D 2300/502* (2013.01); *F05D 2300/607* (2013.01); *F05D 2300/6033* (2013.01)

(58) Field of Classification Search
CPC .. F01D 11/005; F16J 15/0887; F16J 15/0806; F05D 2300/6033; F05D 2240/11; F05D 2300/607; F05D 2300/175; F05D 2300/502
See application file for complete search history.

(56) References Cited

U.S. PATENT DOCUMENTS

| 3,494,709 | A  | * | 2/1970  | Piearcey  | B22D 27/045 416/232 |
| 6,489,583 | B1 |   | 12/2002 | Feng et al. | |
| 6,596,411 | B2 |   | 7/2003  | Feng et al. | |
| 6,733,234 | B2 | * | 5/2004  | Paprotna  | F01D 11/005 277/637 |
| 6,982,126 | B2 |   | 1/2006  | Darolia et al. | |
| 8,016,549 | B2 | * | 9/2011  | Shah      | F01D 5/16 277/650 |

(Continued)

OTHER PUBLICATIONS

Newman et al., "Novel Ultra-High Temperature Metal Seal with Single Crystal Spring Energizer", American Institute ol Aeronautics and Astronautics, Aug. 2-5, 2009, 8 Pages.

(Continued)

*Primary Examiner* — Kenneth Bomberg
*Assistant Examiner* — Adam W Brown
(74) *Attorney, Agent, or Firm* — Dority & Manning, P.A.

(57) ABSTRACT

A turbine system including a sealing component is presented. The sealing component is positioned in a gap between adjacent turbine components of the turbine system. The sealing component includes a metallic shim including a high-temperature-resistant alloy in a single crystal form. A turbine shroud assembly including the sealing component is also presented.

7 Claims, 3 Drawing Sheets

(56) References Cited

U.S. PATENT DOCUMENTS

| | | | | |
|---|---|---|---|---|
| 8,096,758 | B2* | 1/2012 | Schiavo | F01D 5/147 |
| | | | | 415/200 |
| 8,100,640 | B2* | 1/2012 | Strock | F01D 11/122 |
| | | | | 415/173.4 |
| 10,012,099 | B2* | 7/2018 | Cetel | F01D 11/005 |
| 2007/0017906 | A1 | 1/2007 | Nowak et al. | |
| 2008/0106046 | A1* | 5/2008 | Datta | F16J 15/0887 |
| | | | | 277/644 |
| 2010/0034692 | A1 | 2/2010 | Feng et al. | |
| 2010/0200189 | A1 | 8/2010 | Qi et al. | |
| 2010/0304037 | A1* | 12/2010 | Zimmerman | C23C 14/083 |
| | | | | 427/456 |
| 2012/0235366 | A1* | 9/2012 | Walunj | F01D 5/3007 |
| | | | | 277/647 |
| 2015/0354389 | A1* | 12/2015 | Pack | F01D 11/008 |
| | | | | 416/204 A |
| 2016/0312894 | A1* | 10/2016 | McCaffrey | C30B 29/52 |

OTHER PUBLICATIONS

Wahl et al., "New Single Crystal Superalloys, CMSX®-8 and CMSX®-7", Manufacturing Materials and Metallurgy, ASME Turbo Expo 2014: Turbine Technical Conference and Exposition, vol. 6, Jun. 16-20, 2014, 14 Pages.

\* cited by examiner

TURBINE SYSTEMS WITH SEALING COMPONENTS

Embodiments of the present disclosure generally relate to turbine systems, and particularly to sealing components between adjacent turbine components of the turbine systems. Specifically, embodiments of the present disclosure relate to the sealing components having high-temperature-resistant alloys for improved thermal stability in the high temperature environments of the turbine systems.

BACKGROUND

During operation of a turbine system such as a gas turbine system, air is pressurized in a compressor, mixed with fuel in a combustor, and ignited for generating hot combustion gases that flow downstream into a turbine so as to extract mechanical energy therefrom. Many components that form the combustor and turbine sections are directly exposed to the hot gases flow, for example, the combustor liner, transition duct between the combustor and the turbine, and turbine stationary vanes, rotating blades and surrounding shroud assemblies.

Overall efficiency and power of the turbine systems may be increased by increasing the firing temperature of the combustion gases. High efficiency turbine systems may have firing temperatures exceeding about 1600 degrees Celsius, and firing temperatures are expected to be higher than the current typically used firing temperatures as the demand for more efficient turbine systems continues. Ceramic matrix composite ("CMC") materials may be potentially more suitable to withstand and operate at higher temperatures as compared to traditionally used metallic materials (for example, cobalt-based and nickel-based superalloys). Typical CMC materials incorporate ceramic fibers in a ceramic matrix for enhanced mechanical strength and ductility.

Although the use of CMC materials may reduce the cooling requirements in a turbine system, the overall efficiency of the turbine system may be improved by preventing the parasitic losses caused due to the leakage of the hot gases and the cooling medium, and mixing of the cooling medium with the hot gases. For example, sealing mechanisms such as spline seals may be used to seal the gaps between adjacent components of the turbine system to prevent such leakage and mixing. Current spline seals use many different combinations and configurations of metal shims and metal wire mesh. However, these metallic spline seals may not be suitable for use with CMC material components in the turbine systems at high temperatures, for example higher than 1000 degrees Celsius.

Therefore, there is a need for improved sealing components suitable for use in high temperature environments of turbine systems.

BRIEF DESCRIPTION

Provided herein are improved seals for turbine systems. In one aspect provided herein is a turbine system including a sealing component positioned in a gap between adjacent turbine components. The sealing component includes a metallic shim including a high-temperature-resistant alloy in a single crystal form.

In one aspect, a turbine shroud assembly includes a plurality of shroud segments disposed adjacent to one another and a sealing component positioned in a gap between two adjacent shroud segments of the plurality of shroud segments. The sealing component includes a metallic shim including a nickel-based superalloy in a single crystal form.

These and other features, embodiments, and advantages of the present disclosure may be understood more readily by reference to the following detailed description.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Some embodiments are directed to a turbine system that includes a sealing component positioned in a gap between adjacent turbine components. The sealing component includes a metallic shim including a high-temperature-resistant alloy in a single crystal form. Such sealing components advantageously provide improved mechanical properties such as creep resistance, shear/torsional strength and thermal shock resistance at high temperatures in turbine systems.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", is not limited to the precise value specified. In some instances, the approximating language may correspond to the precision of an instrument for measuring the value.

Unless defined otherwise, technical and scientific terms used herein have the same meaning as is commonly understood by one of skill in the art to which this disclosure belongs. The terms "comprising," "including," and "having" are intended to be inclusive, and mean that there may be additional elements other than the listed elements. The terms "first", "second", and the like, as used herein do not denote any order, quantity, or importance, but rather are used to distinguish one element from another.

As used herein, the term "high operating temperature" or "high temperature" refers to an operating temperature that is higher than 1000 degrees Celsius, of a turbine system. In some embodiments, high temperature refers to an operating temperature that is higher than 1200 degrees Celsius. In some embodiments, high temperature refers to an operating temperature that is higher than 1400 degrees Celsius.

Figure 1:
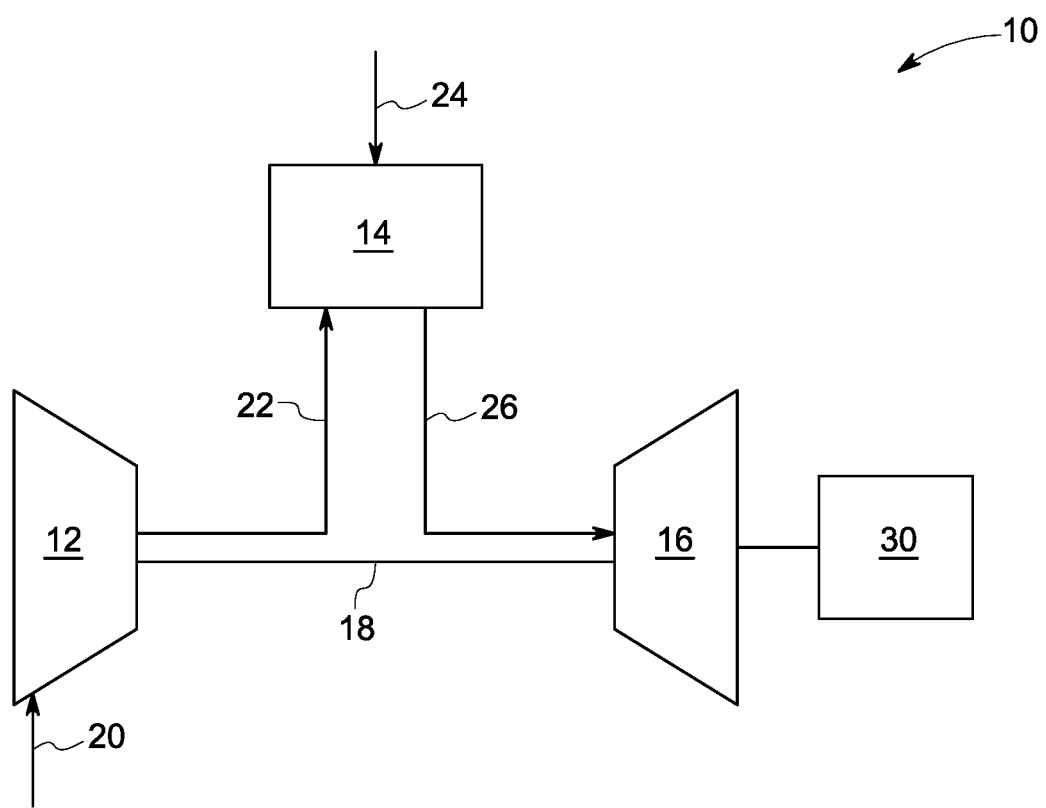
FIG. 1 is a schematic view of a turbine system, in accordance with one embodiment of the systems described herein.

FIG. 1 is a schematic diagram of a turbine system 10, for example a gas turbine system. The turbine system 10 may include a compressor 12, a combustor 14, and a turbine 16. The compressor 12 and turbine 16 may be coupled by a shaft 18. The shaft 18 may be a single shaft or a plurality of shaft segments coupled together to form shaft 18. The compressor 12 compresses an incoming flow of air 20 and deliver the compressed flow of air 22 to the combustor 14. The combustor 14 mixes the compressed flow of air 22 with a pressurized flow of fuel 24 and ignites the mixture to create a flow of combustion gases 26. The flow of combustion gases 26 includes hot gases, and may also be referred to as a hot gas flow; these terms are used interchangeably throughout the specification. In some embodiments, the turbine system 10 may include a plurality of combustors 14. The flow of combustion gases 26 is delivered to the turbine 16. The flow of combustion gases 26 drives the turbine to produce mechanical work. The mechanical work produced in the turbine 16 drives the compressor 12 via the shaft 18 and an external load 30 such as an electrical generator.

Figure 2:
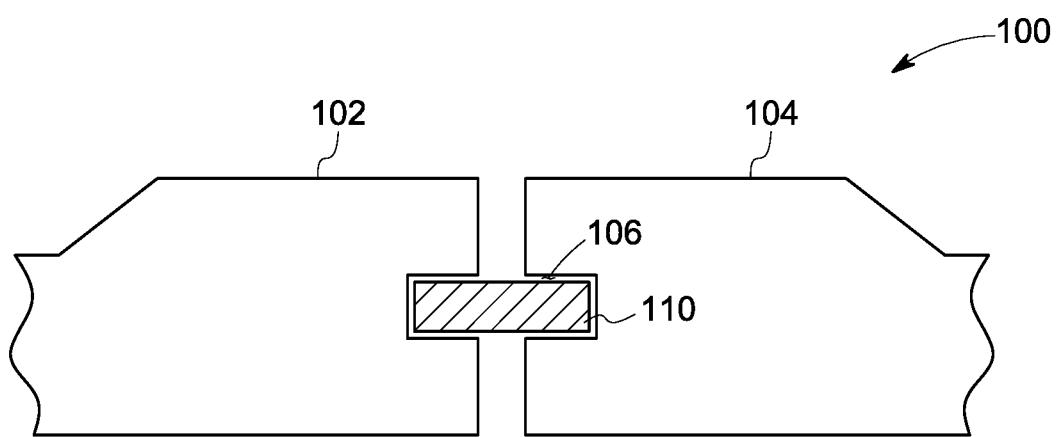
FIG. 2 is a cross sectional schematic view of a portion of a turbine system, in accordance with one embodiment of the systems described herein.

FIG. 2 shows a portion 100 of the turbine system 10 as described herein. In FIG. 2, a first component 102 and a second component 104 of the turbine system 10 are arranged adjacent to one another. The first component 102 and the adjacent second component 104 may be at least a part of the turbine bucket assemblies, turbine nozzle assemblies, turbine shroud assemblies, transition pieces, stage one turbine nozzles, retaining rings, or compressor exhaust components. In some embodiments, the first component 102 and the second components 104 may be similar components, for example shroud segments of a turbine shroud assembly. In some embodiments, the first component 102 and the second components 104 may be different components or parts of different components. For example, the first component 102 may be a transition piece and the adjacent second component 104 may be a stage one turbine nozzle. Further, the first components 102 and the adjacent second component 104 of the present disclosure are not limited to the above components, but may be any components that are at least partially exposed to the hot gas flow, or any components that are subjected to multiple hot gas flows that have a substantial temperature gradient with respect to one another.

When the first component 102 and the second component 104 are arranged or joined adjacent to each other in the turbine system 10 as shown in FIG. 2, the first component 102 and the second component 104 define a gap 106 between them. A sealing component 110 is positioned in the gap 106 between the first component 102 and the second component 104. The sealing component 110 blocks the gap 106 between the first and the second components (102, 104) to prevent, or at least substantially reduce, a leakage of a hot gas flow, a cooling medium flow or both, or mixing of the two thereof. In some embodiments, the sealing component 110 may also be referred to as "spline seal."

The sealing component 110 includes a metallic shim that extends to a length of a joining interface of the first component 102 and the second component 104. As used herein, the term "metallic shim" refers to a long rigid piece or bar of a metallic material. Further, the term "metallic shim" does not necessarily mean a uniform thickness, and the metallic shim may have a uniform or a variable thickness. The metallic shim may have a thickness less than 5 millimeters. In some embodiments, the metallic shim has a thickness in a range from about 0.01 millimeter to about 4 millimeters. In some embodiments, the metallic shim has a thickness in a range of from about 0.1 millimeter to about 3 millimeters. In some embodiments, the metallic shim has a thickness in a range of from about 0.1 millimeter to about 1 millimeter. In certain embodiments, the metallic shim has a thickness in a range of from about 0.2 millimeters to about 0.5 millimeters. In some other embodiments, the metallic shim has a thickness in a range of from about 1 millimeter to about 3 millimeters. The thickness of the metallic shim for use in a sealing component in a turbine system may depend on an end use application of the turbine system.

According to some embodiments, the metallic shim includes a high-temperature-resistant alloy in a single crystal form. A high-temperature-resistant alloy typically includes a nickel-based, cobalt-based or iron-based superalloy characterized by desirable mechanical properties. Illustrative nickel-based and/or cobalt-based superalloys are designated by the trade names INCONEL (e.g., INCONEL 718), NIMONIC, René alloys (for example, René N5, René 88, René 104 alloys), HAYNES, and UDIMET. The high-temperature-resistant alloys generally provide desirable strength, thermal and environmental stability, and ability to retain the mechanical integrity at high temperatures and during the thermal cycling operations of turbine systems.

In certain embodiments, the high-temperature-resistant alloy is a nickel-based superalloy. The nickel-based superalloy may include a composition having about 5 weight percent (wt. %) to about 10 wt. % chromium, about 5 wt. % to about 10 wt. % cobalt, about 0 wt. % to about 2 wt. % molybdenum, about 3 wt. % to about 10 wt. % tungsten, about 3 wt. % to about 8 wt. % tantalum, about 0 wt. % to about 2 wt. % titanium, about 5 wt. % to about 7 wt. % aluminum, about 0 wt. % to about 6 wt. % niobium and the balance nickel and incidental impurities. In some embodiments, the nickel-based superalloy may further include additional alloying elements such as carbon, boron, yttrium, hafnium, or combinations thereof. Each additional alloying element may be present in an amount less than 1 wt. %. A composition of a nickel-based superalloy may be characterized to achieve desired mechanical and environmental properties by controlling concentration of one or more alloying elements. In some embodiments, the metallic shim includes a nickel-based superalloy in a single crystal form. For example, an alloy that can be used in making the metallic shim is a nickel-based superalloy available under the trade name René N5 that has a nominal composition, by weight, of 7% chromium, 8% cobalt, 2% molybdenum, 5% tungsten, 7% tantalum, 6% aluminum, 3% rhenium, 0.2% hafnium, with the balance being nickel.

As noted, the metallic shim includes the high-temperature-resistant alloy in a single crystal form. The metallic shim may be obtained, for example by cutting a shim of a desired shape and size from a single crystal cast of the high-temperature-resistant alloy. The high-temperature-resistant alloy may be cast by using any suitable casting technique, for example unidirectional casting technique to obtain single crystal form that is, single crystal microstructure. In some embodiments, the high-temperature-resistant alloy is cast by a directional solidification process. Such cast may also be referred to as a directionally solidified cast. Further, the high-temperature-resistant alloy may be cast in a single crystal form in a desired crystal direction. In some embodiments, the single crystal form of the high-temperature-resistant alloy may include a single crystal grown in the desired crystal direction. In some embodiments, the single crystal form of the high-temperature-resistant alloy may include grains grown in the desired direction. In some embodiments, the high-temperature-resistant alloy is cast in a single crystal form along a crystal direction <001>. Crystal structures having a crystal direction other than <001> are also within the scope of embodiments presented herein. In certain embodiments, the metallic shim includes the high-temperature-resistant alloy in the single crystal form oriented in <001> crystal direction.

The metallic shim of a desired shape and size may be cut from the single crystal cast for use as the metallic shim in the sealing component. Various cutting methods may be used to cut a shim from the single crystal cast of the high-temperature-resistant alloy. A suitable example of the cutting method may be an electrical discharge machining (EDM). Other examples of the cutting method may include fluid cutting method or laser cutting method. In some embodiments, the metallic shim is cut by the wire-cut electrical discharge machining (EDM). In certain instances, a thin metallic shim, for example having a thickness less than 2 millimeters can be cut from the single crystal cast of the high-temperature-resistant alloy using the wire-cut EDM. The wire-cut EDM can be performed in a crystal direction to maximize desired mechanical properties, for example strength in the crystal direction. On cutting the metallic shim using the wire-cut EDM, a recast layer may form on a surface of the metallic shim. The recast layer may be removed prior to use the metallic shim in a desired application by using any suitable process, for example grinding or a chemical process.

The metallic shim, as described herein, exhibit desired properties such as creep resistance, oxidation and corrosion resistance, and strain-to-failure value at high temperatures. Such metallic shims may be desirable for enabling the desired characteristic for a sealing component in a turbine system such as creep resistance, shear/torsional strength and thermal shock resistance at high temperatures (for example, higher than 1200 degrees Celsius). As used herein, the term "strain-to-failure" measures an amount of strain withstood by a solid material in tension before it fails or cracks.

In some embodiments, the metallic shim is a single piece of the high-temperature-resistant alloy in a single crystal form. For example, the metallic shim is a single piece cut from a single crystal cast of the high-temperature-resistant alloy, for example a nickel-based superalloy. In some embodiments, the sealing component 110 includes a single metallic shim. In some embodiments, the sealing component 110 includes a plurality of metallic shims. The plurality of metallic shims may include metallic shims of same or different high-temperature-resistant alloy(s). In some embodiments, each metallic shim of the plurality of the metallic shims includes the high-temperature-resistant alloy in a single crystal form. Also contemplated within the scope of embodiments presented herein are embodiments wherein the plurality of metallic shims may include different high-temperature-resistant alloys in single crystal forms for each metallic shim.

The sealing component 110, that includes a single metallic shim or a plurality of metallic shims may have any shape known in the art. For example, in one embodiment, the sealing component 110 may have rectangular cross-sections, as shown in FIG. 2. Further, in some other embodiments, a sealing component may have any cross-sectional shapes known in the art that may provide a seal between adjacent components of a turbine system. Further, the sealing component may have a substantially flat profile, a substantially U-shaped profile, a substantially S-shaped profile, a substantially W-shaped profile, or a substantially N-shaped profile.

In some embodiments, the sealing component 110 further includes a protective coating disposed on a surface of the metallic shim. The protective coating may be disposed to protect the metallic shim from high temperature, corrosive environment, and any contamination caused by or reaction with any adjacent component in the turbine systems. In embodiments where the sealing component 110 includes a plurality of metallic shims, each metallic shim of the plurality of metallic shims is coated with the protective coating.

In some embodiments, the protective coating may include a bond coat layer disposed on the surface of the metallic shim. The bond coat layer may include a metallic oxidation-resistant material. Suitable materials for the bond coat layer include metal aluminides or MCrAlY alloy, where M represents a metal such as iron, nickel, platinum or cobalt. The bond coat layer may have a thickness in a range of from about 25 microns to about 500 microns. The bond coat layer may be applied, or formed on a surface of the metallic shim by any conventional technique such as physical vapor deposition (PVD), electron beam physical vapor deposition (EBPVD), chemical vapor deposition (CVD), sol-gel method, plasma spray such as air plasma spray (APS) and vacuum plasma spray (VPS), or combinations of two or more of the aforementioned techniques.

In some embodiments, the bond coat layer includes a metal aluminide. The metal aluminide may include nickel, zirconium, chromium, or combinations thereof. In some embodiments, the metal aluminide is deposited on a surface of the metallic shim using a vapor phase aluminiding (VPA) process. The VPA process typically includes applying a suitable metal aluminide layer on a surface of a component by using any suitable process such as an ion plasma deposition process or electron beam physical deposition (EB-PVD) and placing the coated component in a VPA chamber. The VPA chamber includes donor alloy pellets of, for example chromium-aluminum, cobalt-aluminum or nickel-aluminum composition and a halide activator to produce aluminum containing vapors, and a source of heat. In way of an example, a temperature within the VPA chamber is set to between 1800 degrees Fahrenheit and 2050 degrees Fahrenheit, and the aluminide gases are then generated from the reaction of the donor alloy pellets and the halide gases in the chamber such that a portion of the aluminum gases is deposited on the surfaces of the metallic shim over a period of time between about thirty minutes and ten hours.

In some embodiments, the protective coating may further include a thermal barrier layer disposed on the bond coat layer. The thermal barrier layer may include a ceramic material. In some embodiments, the ceramic material is selected from the group consisting of zirconia, zirconate, alumina, aluminate, magnesia, ceria, scandia, garnet, and combinations thereof. Non-limiting examples of suitable ceramic materials for use in thermal barrier layer may include partially or fully stabilized zirconia, partially stabilized hafnia, doped alumina, rare earth aluminate garnets, zirconia toughened alumina or combinations thereof. In certain embodiments, the thermal barrier layer includes yttria stabilized zirconia. Suitable deposition techniques for depositing the ceramic material may include plasma spray, flame spray or vapor deposition techniques. The thermal barrier layer may have a thickness in a range of from about 25 microns to about 500 microns.

Figure 3:
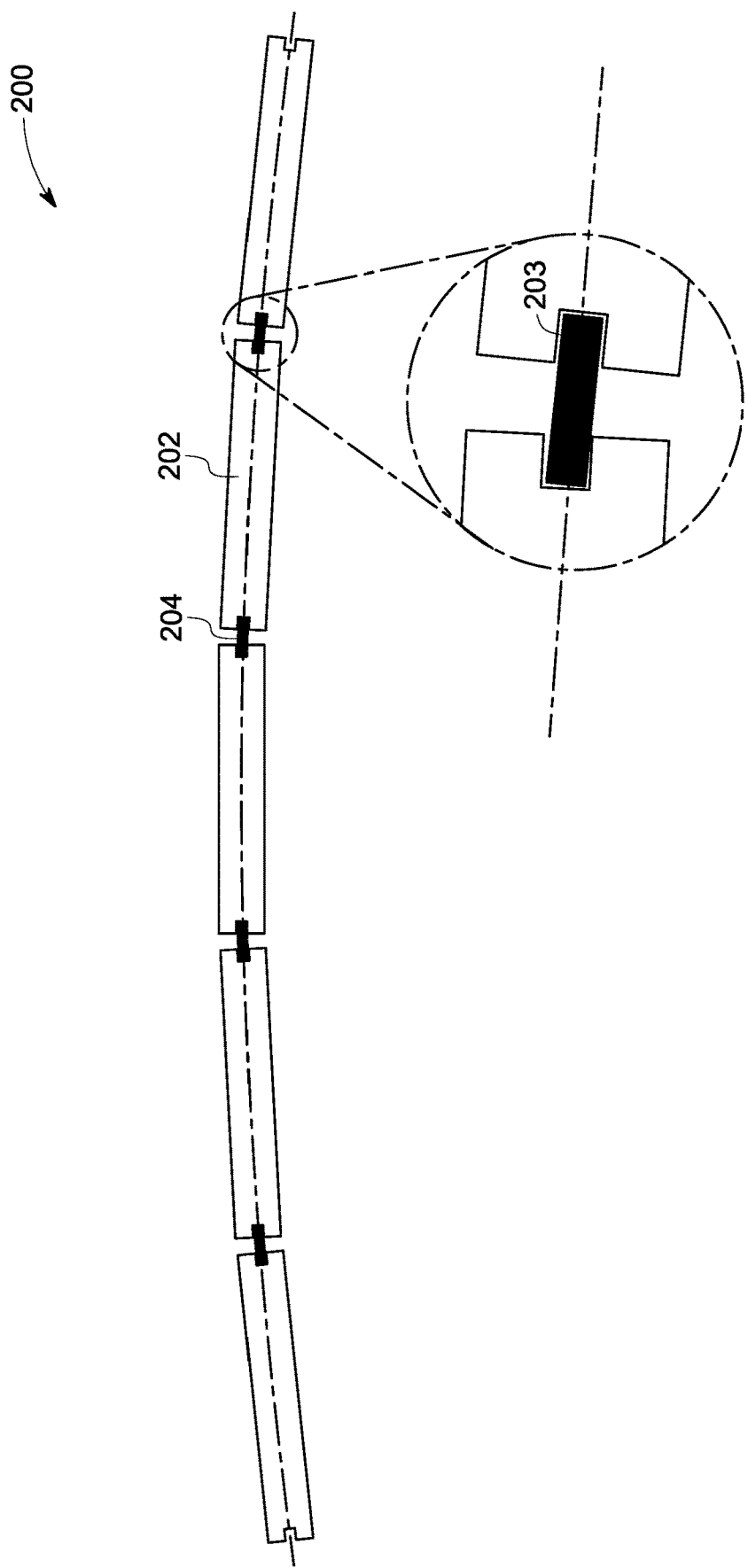
FIG. 3 is a cross sectional schematic view of a portion of a turbine shroud assembly, in accordance with one embodiment of the systems described herein.

In one embodiment, FIG. 3 shows a cross sectional view of a portion of a turbine shroud assembly 200. The turbine shroud assembly 200 may include a plurality of shroud segments 202. The shroud segments 202 are arranged adjacent to one another to form an annular structure. In one embodiment, the shroud segments 202 include a ceramic matrix composite (CMC). A particular example of a CMC material is a material having a matrix of silicon carbide or silicon nitride, with a reinforcement phase of silicon carbide disposed within the matrix, often in the form of fibers. The turbine shroud assembly 200 may further include a sealing component 204 disposed between two adjacent shroud segment 202. In some embodiments, the sealing component 204 may be disposed in a gap 203 (for example, a slot or a channel) defined on adjacent shroud segments 202. The sealing component 204 includes a metallic shim including a high-temperature-resistant alloy in a single crystal form. Various details of the metallic shim and the high-temperature-resistant alloy are described above. In some embodiments, the turbine shroud assembly 200 includes a plurality of sealing components 204 disposed in the gap 203 between each pair of the shroud segments 202.

EXAMPLES

Example 1

An ingot was cast from René N5 alloy in single crystal form along <001> direction. Two sample shims of desired length and width of a turbine seal and thicknesses about 0.25 millimeters and about 1.5 millimeters were cut from the ingot by wire-cut EDM. The recast layers from the surfaces of the sample shims were removed by grinding. After removal of the recast layers, the sample shims were coated with a chromium aluminide layer of about 0.025 millimeters by vapor phase aluminiding process followed by a yttria stabilized zirconia layer of about 0.05 millimeters by electron beam physical vapor deposition to form coated sample shims.
Flow Bench Testing The coated sample shims were installed in a flow rig. The coated sample shims were placed over a gap which was similar in dimension to a gap between adjacent shroud segments in a gas turbine. A pressure differential ranging from 20 psi to 120 psi was applied across the coated sample shims by flowing air through a path which consisted of the coated sample shims placed over the gap. The performance of the coated sample shims was similar to that of conventional metallic seals. Further, it was observed that the coated sample shims were able to withstand the strain generated in the unsupported portions of the coated sample shims due to the applied pressure differential.
Furnace Cycle Test The coated sample shims were loaded into a rapid cycle furnace to determine resistance to coating spallation. Coated sample shims were heated to about 2070 degrees Fahrenheit in about 15 minutes and then held at this temperature for about 5 hours. After this heat treatment, coated sample shims were immediately air quenched to room temperature with the assistance of fan blowing air and then held at room temperature for about 10 minutes. This thermal cycle was repeated about 100 times and then the coated sample shims were examined visually after the final cycle. The coated sample shims survived the rapid furnace cycle test and were considered to be in good condition upon the completion of the furnace cycle test.
Engine Test The coated sample shims were installed in a rig which simulated a combustion environment. The coated sample shims were able to withstand thermal and mechanical loading at about 1400 degrees Fahrenheit and about 20 psi for about 3 hours.

Example 2

A number of coated sample shims of thickness about 0.4 millimeters were made using the process as described in example 1. Each coated sample shim was wedged between two pieces of about 0.5 inches'×0.5 inches'×0.2 inches' made of ceramic matrix composite material to form corresponding sandwich structures. These sandwich structures were tested in an oven by applying a load on top of the sandwich structures. All coated sample shims were able to withstand thermal and mechanical loading up to 2000 degrees Fahrenheit and 600 psi contact pressure for about 100 hours.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A turbine system comprising: a sealing component positioned in a gap between adjacent turbine components comprising a ceramic matrix composite, wherein the sealing component comprises a metallic shim comprising a high-temperature-resistant alloy in a single crystal form oriented in <001> crystal direction;
   wherein the sealing component further comprises a protective coating disposed on a surface of the metallic shim; and
   wherein the protective coating comprises a bond coat layer disposed on the surface of the metallic shim.

2. The turbine system of claim 1, wherein the bond coat layer comprises a metal aluminide.

3. The turbine system of claim 1, wherein the protective coating further comprises a thermal barrier layer disposed on the bond coat layer.

4. The turbine system of claim 3, wherein the thermal barrier layer comprises a ceramic material selected from the group consisting of zirconia, zirconates, alumina, aluminates, garnets, magnesia, ceria, scandia, and combinations thereof.

5. The turbine system of claim 4, wherein the ceramic material comprises partially or fully stabilized zirconia, partially stabilized hafnia, doped alumina, rare earth aluminate garnets, zirconia toughened alumina, or combinations thereof.

6. A turbine shroud assembly, comprising: a plurality of shroud segments comprising a ceramic matrix composite disposed adjacent to one another; and a sealing component positioned in a gap between two adjacent shroud segments of the plurality of shroud segments, wherein the sealing component comprises a metallic shim comprising a nickel-based superalloy in a single crystal form oriented in <001> crystal direction;
   wherein the sealing component comprises a plurality of metallic shims.

7. The turbine shroud assembly of claim 6, wherein the plurality of metallic shims comprises metallic shims of different nickel-based superalloys in single crystal forms.

* * * * *